United States Patent
Mook et al.

(10) Patent No.: US 10,914,195 B2
(45) Date of Patent: Feb. 9, 2021

(54) ROTARY MACHINE WITH GAS BEARINGS

(71) Applicant: General Electric Company, Schenectady, NY (US)

(72) Inventors: Joshua Tyler Mook, Loveland, OH (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 768 days.

(21) Appl. No.: 15/131,164

(22) Filed: Apr. 18, 2016

(65) Prior Publication Data

US 2017/0298772 A1    Oct. 19, 2017

(51) Int. Cl.
| | |
|---|---|
| F01D 25/22 | (2006.01) |
| F16C 32/06 | (2006.01) |
| F01D 5/02 | (2006.01) |
| F01D 25/16 | (2006.01) |
| F04D 29/32 | (2006.01) |
| F04D 29/057 | (2006.01) |
| F04D 29/051 | (2006.01) |

(52) U.S. Cl.
CPC .............. *F01D 25/22* (2013.01); *F01D 5/02* (2013.01); *F01D 25/16* (2013.01); *F04D 29/057* (2013.01); *F04D 29/0513* (2013.01); *F04D 29/321* (2013.01); *F16C 32/0614* (2013.01); *F16C 32/0622* (2013.01); *F16C 32/0607* (2013.01); *F16C 2360/23* (2013.01); *Y02T 50/60* (2013.01)

(58) Field of Classification Search
CPC ........ F01D 11/04; F01D 11/003; F01D 25/16; F01D 25/22; F16C 32/0622
See application file for complete search history.

(56) References Cited

U.S. PATENT DOCUMENTS

| | | | | |
|---|---|---|---|---|
| 2,926,050 A | * | 2/1960 | Battle | ................... F01D 25/166 384/121 |
| 2,972,504 A | | 2/1961 | Baker | |
| 3,004,804 A | | 10/1961 | Pinkus et al. | |
| 3,110,526 A | | 11/1963 | Sternlicht | |
| 3,351,394 A | * | 11/1967 | Hooker | ................... F16C 17/03 384/108 |

(Continued)

FOREIGN PATENT DOCUMENTS

| | | |
|---|---|---|
| CA | 2 926 636 A1 | 4/2015 |
| CH | 550340 A | 6/1974 |

(Continued)

OTHER PUBLICATIONS

Gunter et al., "Design of Nonlinear Squeeze-Film Dampers for Aircraft Engines", Journal of Lubrication Technology, vol. No. 99, Issue No. 01, pp. 57-64, Mar. 10, 1976.

(Continued)

*Primary Examiner* — Ninh H. Nguyen
*Assistant Examiner* — Aye S Htay
(74) *Attorney, Agent, or Firm* — Dority & Manning, P.A.

(57) ABSTRACT

A rotary machine for an aeronautical device includes a thrust generator. The rotary machine additionally includes a rotary component rotatable with the thrust generator. Moreover, the rotary machine of the present disclosure includes a plurality of gas bearings, with the plurality of gas bearings substantially completely supporting the rotary component of the rotary machine.

18 Claims, 7 Drawing Sheets

(56) References Cited

U.S. PATENT DOCUMENTS

| | | | |
|---|---|---|---|
| 3,395,949 A * | 8/1968 | Kun | F01D 25/22 384/119 |
| 3,568,438 A * | 3/1971 | Meienberg | F01D 15/08 184/6 |
| 3,620,581 A * | 11/1971 | Heller | F16O 32/0618 384/100 |
| 3,721,479 A | 3/1973 | Rasnick et al. | |
| 3,863,996 A | 2/1975 | Raimondi | |
| 3,891,281 A | 6/1975 | Jenness | |
| 3,898,793 A | 8/1975 | Nakamura et al. | |
| 3,944,304 A | 3/1976 | Purtschert | |
| 3,994,541 A | 11/1976 | Geary et al. | |
| 4,226,483 A | 10/1980 | Yamamoto | |
| 4,262,975 A | 4/1981 | Heshmat et al. | |
| 4,410,220 A | 10/1983 | Robinson | |
| 4,632,574 A | 12/1986 | Wilson et al. | |
| 4,743,125 A | 5/1988 | Dammel et al. | |
| 4,793,722 A | 12/1988 | Jensen | |
| 4,872,767 A | 10/1989 | Knapp | |
| 4,921,229 A | 5/1990 | Hori | |
| 4,971,458 A | 11/1990 | Carlson | |
| 5,044,781 A | 9/1991 | Werner | |
| 5,085,521 A | 2/1992 | Singh | |
| 5,149,206 A | 9/1992 | Bobo | |
| 5,222,815 A | 6/1993 | Ide | |
| 5,328,408 A | 7/1994 | Wolf et al. | |
| 5,360,273 A | 11/1994 | Buckmann | |
| 5,374,129 A | 12/1994 | Vohr et al. | |
| 5,380,100 A | 1/1995 | Yu | |
| 5,421,655 A | 6/1995 | Ide | |
| 5,501,531 A | 3/1996 | Hamaekers | |
| 5,603,574 A | 2/1997 | Ide | |
| 5,743,654 A | 4/1998 | Ide | |
| 6,019,515 A | 2/2000 | Fujii et al. | |
| 6,169,332 B1 | 1/2001 | Taylor et al. | |
| 6,286,303 B1 | 9/2001 | Pfligler et al. | |
| 6,308,810 B1 | 10/2001 | Kuwayama | |
| 6,536,565 B2 | 3/2003 | Oliver et al. | |
| 6,679,045 B2 | 1/2004 | Karafillis et al. | |
| 6,700,747 B2 | 3/2004 | Matz | |
| 6,883,967 B2 | 4/2005 | Robb et al. | |
| 7,290,931 B2 | 11/2007 | Wardman et al. | |
| 7,394,076 B2 | 7/2008 | Devitt | |
| 7,431,504 B1 | 10/2008 | Pelfrey | |
| 7,517,152 B1 | 4/2009 | Walsh | |
| 7,607,647 B2 | 10/2009 | Zhao et al. | |
| 7,625,121 B2 | 12/2009 | Pettinato et al. | |
| 7,628,542 B2 | 12/2009 | Wada et al. | |
| 7,896,550 B1 | 3/2011 | Pinera et al. | |
| 7,987,599 B2 | 8/2011 | Mavrosakis | |
| 8,083,413 B2 | 12/2011 | Ertas | |
| 8,118,570 B2 | 2/2012 | Meacham et al. | |
| 8,146,369 B2 | 4/2012 | Walitzki et al. | |
| 8,206,039 B2 | 6/2012 | Maier | |
| 8,209,834 B2 | 7/2012 | Mons et al. | |
| 8,240,919 B2 | 8/2012 | Hirata | |
| 8,256,750 B2 | 9/2012 | Cottrell et al. | |
| 8,272,786 B2 | 9/2012 | Cottrell | |
| 8,342,796 B2 | 1/2013 | Spencer et al. | |
| 8,366,382 B1 * | 2/2013 | Muldoon | F01D 11/02 415/111 |
| 8,591,117 B2 | 11/2013 | Giraud et al. | |
| 8,702,311 B2 | 4/2014 | Matsuo et al. | |
| 8,720,205 B2 | 5/2014 | Lugg | |
| 8,796,893 B2 | 8/2014 | Muth | |
| 8,814,437 B2 | 8/2014 | Braun | |
| 8,834,027 B2 | 9/2014 | Zeidan | |
| 8,998,492 B2 | 4/2015 | Bertea | |
| 9,046,001 B2 | 6/2015 | Hindle et al. | |
| 9,121,448 B2 | 9/2015 | Delgado Marquez et al. | |
| 9,169,846 B2 | 10/2015 | Mariotti | |
| 9,297,438 B2 | 3/2016 | Meacham et al. | |
| 2005/0008269 A1 | 1/2005 | Akutsu et al. | |
| 2006/0054660 A1 | 3/2006 | Chappell | |
| 2008/0089783 A1 * | 4/2008 | Addis | F01D 5/20 415/170.1 |
| 2013/0186105 A1 * | 7/2013 | Meacham | F01D 25/28 60/797 |
| 2013/0216174 A1 | 8/2013 | Braun | |
| 2014/0140645 A1 | 5/2014 | Meacham et al. | |
| 2014/0154058 A1 | 6/2014 | Meacham et al. | |
| 2014/0255156 A1 | 9/2014 | Ullah et al. | |
| 2014/0286599 A1 | 9/2014 | Devitt et al. | |
| 2015/0104123 A1 | 4/2015 | Ertas et al. | |
| 2015/0275967 A1 | 10/2015 | Ryu | |
| 2016/0237844 A1 * | 8/2016 | Holowczak | F04D 29/057 |

FOREIGN PATENT DOCUMENTS

| | | |
|---|---|---|
| EP | 0642130 A2 | 3/1995 |
| EP | 2853759 A1 | 4/2015 |
| GB | 2445074 B | 6/2012 |
| JP | 2001050267 A | 2/2001 |
| JP | 2009030704 A | 2/2009 |
| JP | 2012092969 A | 5/2012 |
| WO | 2004/076821 A1 | 9/2004 |
| WO | 2006/069291 A2 | 6/2006 |

OTHER PUBLICATIONS

Heshmat et al., "Analysis of Gas-Lubricated Foil Journal Bearings", Journal of Lubrication Technology, vol. No. 105, Issue No. 4, pp. 647-655, Oct. 1, 1983.

Agrawal, "Foil Air/Gas Bearing Technology—An Overview", Microturbines and Small Turbomachinery, ASME International Gas Turbine and Aeroengine Congress and Exhibition, Orlando, Florida, USA, Paper No. 97-GT-347, 11 pages, Jun. 2-5, 1997.

US Non-Final Office Action issued in connection with related U.S. Appl. No. 15/131,113 dated Nov. 17, 2016.

GE Related Case Form.

Dellacorte et al., "Load Capacity Estimation of Foil Air Journal Bearings for Oil-Free Turbomachinery Applications", Tribology Transactions, Taylor & Francis Online, vol. No. 43, Issue No. 4, pp. 795-801, 2000.

Andres, "Hybrid Flexure Pivot-Tilting Pad Gas Bearings: Analysis and Experimental Validation", Journal of Tribology, ASME, vol. No. 128, Issue No. 3, 551-558, Mar. 1, 2006.

Gu et al., "Laser additive manufacturing of metallic components: materials, processes and mechanisms", International Materials Reviews, Maney Online, vol. No. 57, Issue No. 3, pp. 133-164, May 2012.

US Notice of Allowance issued in connection with related U.S. Appl. No. 14/566,798 dated Apr. 26, 2016.

European Search Report and Opinion Issued in connection with related EP Application No. 17165709.1 dated May 31, 2017.

US Non-Final Office Action Issued in connection with related U.S. Appl. No. 15/131,081 dated Jun. 13, 2017.

US Non-Final Rejection issued in connection with related U.S. Appl. No. 15/131,136 dated May 8, 2017.

Machine Translation and First Office Action and search issued in connection with corresponding CN Application No. 201710253088.1 dated Oct. 22, 2018.

Office Action issued in connection with corresponding CA Application No. 2963515 dated Dec. 17, 2018.

Machine Translation and Notification of Reasons for Refusal issued in connection with corresponding JP Application No. 2017-074091 dated Aug. 14, 2018.

Second Chinese Office Action Corresponding to CPME1741125/ 284128-CN-3 dated Aug. 15, 2019.

* cited by examiner

ROTARY MACHINE WITH GAS BEARINGS

FIELD OF THE INVENTION

The present subject matter relates generally to a rotary machine having one or more gas bearings.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, compressor impellers, turbines, couplings, sealing packs, and other elements required for optimal operation under given operating conditions. These rotor assemblies have a mass generating a constant static force due to gravity, and also generate a dynamic force due, e.g., to imbalances in the rotor assembly during operation. Such gas turbine engines include bearings to sustain and support these forces while permitting rotation of the rotor assembly.

Additionally, conventional bearings included within the gas turbine engine are oil-lubricated bearings. In order to contain the oil, gas turbine engines include sumps surrounding each of the bearings, and also include oil pumps, oil lines, and other features for supporting the oil-lubricated bearings. However, inclusion of these supporting features may result in a relatively complicated, and potentially heavy, gas turbine engine. Accordingly, a gas turbine engine having one or more features allowing for simplification of the bearing configuration would be beneficial. More specifically, a gas turbine engine having one or more features allowing for removal of the oil-lubricated bearings would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a rotary machine for an aeronautical device is provided. The rotary machine includes a thrust generator, rotary component rotatable with the thrust generator, and a plurality of gas bearings. The plurality of gas bearings substantially completely support the rotary component.

In another exemplary embodiment of the present disclosure, a turbomachine is provided. The turbomachine includes a compressor section including a compressor, a turbine section including a turbine, and a spool including a compressor portion and a turbine portion. The compressor portion is positioned within the compressor section and is attached to and rotatable with the compressor, and the turbine portion is positioned within the turbine section and is attached to and rotatable with the turbine. The turbomachine additionally includes a plurality of gas bearings substantially completely supporting at least one of the compressor and the compressor portion of the spool or the turbine and turbine portion of the spool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
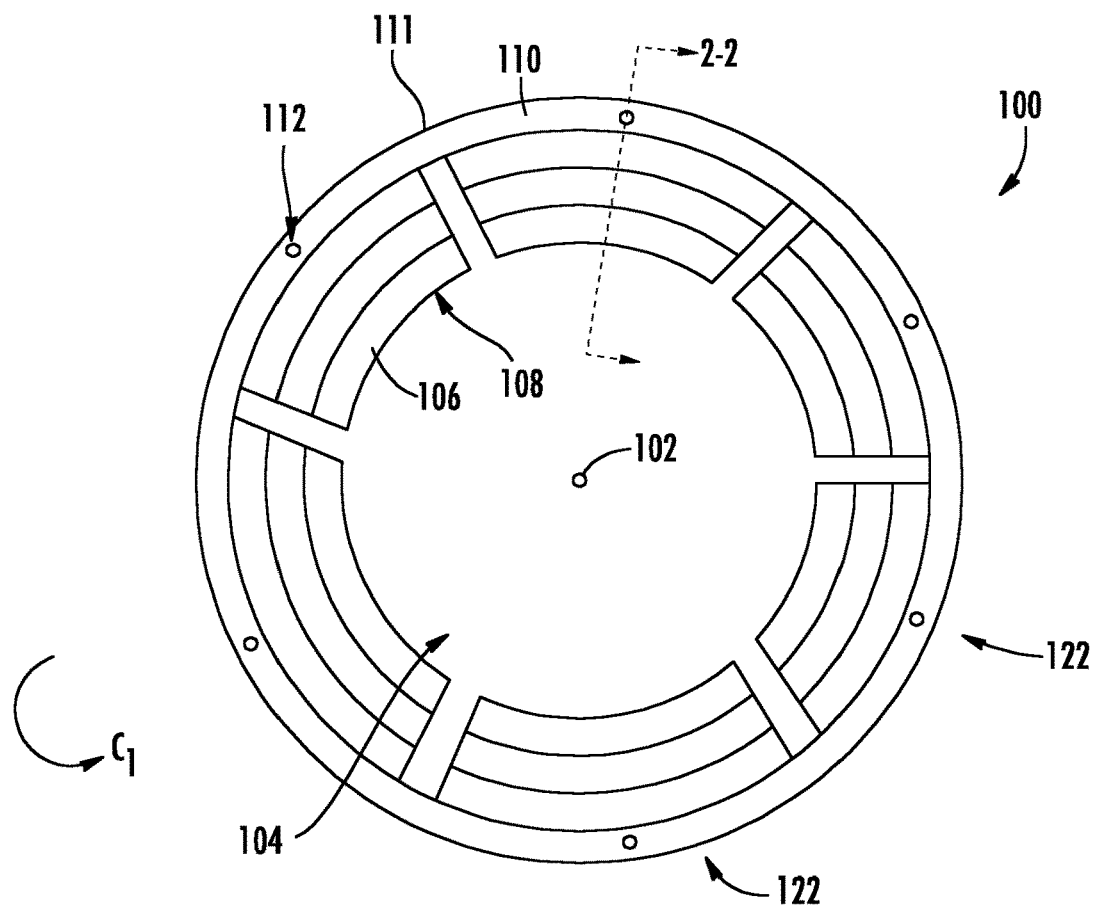
FIG. 1 is an axial view of a gas bearing in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
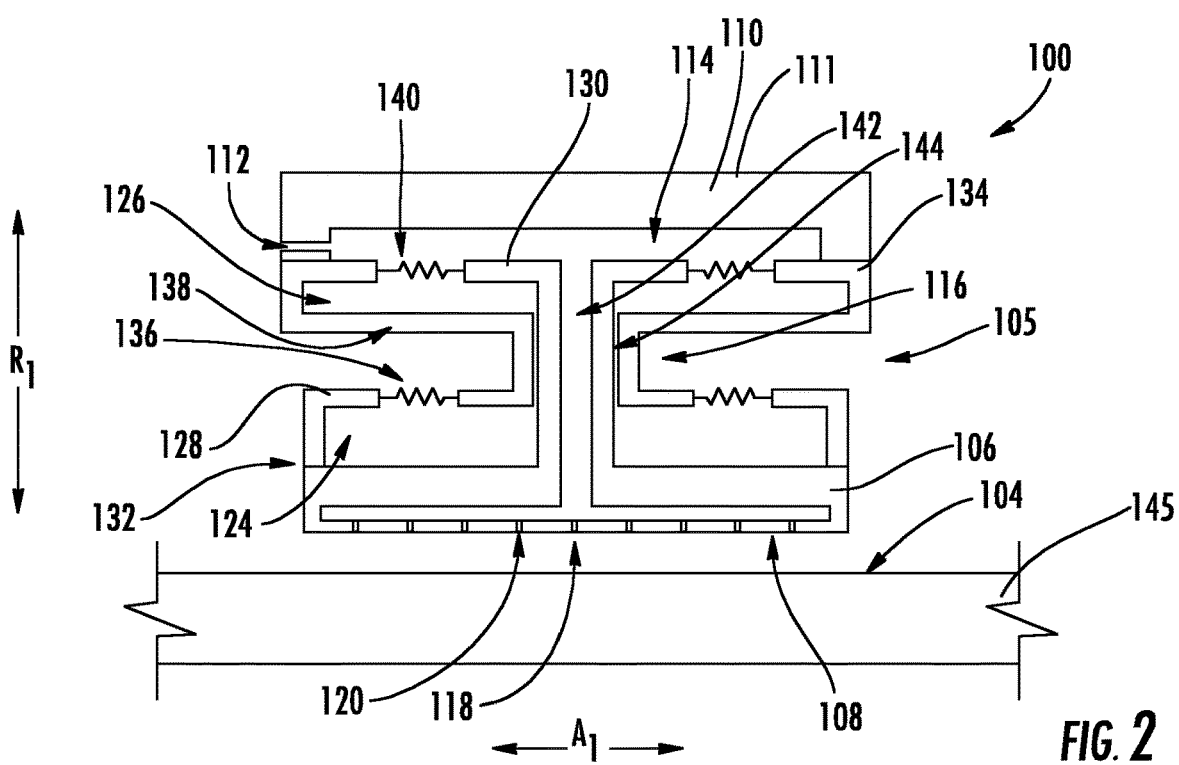
FIG. 2 is a side a cross-sectional view of the exemplary gas bearing of FIG. 1, taken along Line 2-2 of FIG. 1.

Referring now to the drawings, wherein identical numerals indicate the same elements throughout the figures, FIGS. 1 and 2 depict a gas bearing 100 in accordance with an exemplary embodiment of the present disclosure. Specifically, FIG. 1 provides a side view of a gas bearing 100 in accordance with an exemplary embodiment of the present disclosure; and FIG. 2 provides a schematic, cross-sectional view of the exemplary gas bearing 100 of FIG. 1, taken along Line 2-2 in FIG. 1. In certain exemplary embodiments, the exemplary gas bearing 100 may be incorporated into the exemplary turbofan engine 300 described below with reference to FIG. 5.

As shown, the exemplary gas bearing 100 generally defines an axial direction A1 (and a central axis 102 extending generally along the axial direction A1), a radial direction R1, and a circumferential direction C1 (FIG. 1). The bearing 100 defines an axial opening 104 and is configured to support a rotary component 145 (see FIG. 2), e.g., of the turbofan engine 300, within the axial opening 104. The bearing 100 generally includes one or more bearing pads 106, each defining an inner surface 108 for supporting the rotary component 145 and one or more damper assemblies 105 attached to or formed integrally with the bearing pad 106. Additionally, the exemplary gas bearing includes an outer wall 111 surrounding the bearing 100, the outer wall attached to or formed integrally with a damper assembly 105 of the bearing 100.

The bearing 100 is configured as a "gas" bearing, or oil-free/oil-less bearing, and accordingly the bearing 100 is generally configured to provide the inner surfaces 108 of the one or more bearing pads 106 with a flow of a working gas (e.g., air, compressed air and combustion gases, or the like) during operation to create separation with the rotary component 145 and provide a low friction means for supporting such rotary component 145 (not depicted).

The gas bearing generally includes a first end along the axial direction A1 and a second, opposite end along the axial direction A1. As is also depicted, the gas bearing includes a gas inlet 112 at the first end along the axial direction A1 and a supply channel 114 (FIG. 2) extending from the gas inlet 112 to a column 116. The column 116 is configured to provide the bearing pad 106 with a flow of the working gas from the supply channel 114, as will be discussed in greater detail below.

Additionally, for the exemplary embodiment depicted, the column 116 is configured as a support member substantially fully supporting the bearing pad 106. Specifically, as is depicted, the column 116 extends towards the bearing pad 106 and supports the bearing pad 106. Further, for the embodiment depicted, the column 116 is located approximately at a center of the bearing pad 106. More particularly, the bearing pad 106 depicted defines a center 118 along the axial direction A1 and along the circumferential direction C1, and the column 116 is at least partially attached to or formed integrally with the bearing pad 106 proximate the center 118 of the bearing pad 106. However, in other embodiments, the column 116 may instead be positioned off-center from the bearing pad 106.

In certain embodiments, the bearing pad 106 may be configured to disperse and/or diffuse the working gas to support and/or lubricate the rotary component 145 during operation of the bearing 100. In such manner, the bearing 100 may provide a hydrostatically pressurized compliant bearing pad 106. For example, the exemplary bearing pad 106 depicted includes a plurality of gas distribution holes 120 disposed across the bearing pad 106 to provide an evenly distributed pressure field within the axial opening 104 for supporting and/or lubricating the rotary component 145.

The exemplary plurality of gas distribution holes 120 depicted are spaced substantially evenly along the axial direction A1. However, in other embodiments the plurality of gas distribution holes 120 may be arranged in other suitable manners. Additionally, in certain embodiments, the plurality of gas distribution holes 120 may generally have a diameter in the range of between about 2 mils (about 50 micrometers) and about 100 mils (about 2,540 micrometers) and, more specifically, between about 5 mils (about 127 micrometers) and about 20 mils (about 508 micrometers). Alternatively, or in addition, in some embodiments, each bearing pad 106 may have a sufficiently high gas permeability to permit the working gas received from the column 116 to generate sufficient pressure within axial opening 104 to provide the support and/or lubrication of the rotary component 145.

Furthermore, as is depicted in FIG. 1, the bearing 100 includes a plurality of sections 122 spaced along the circumferential direction C1 of the bearing 100. Each section 122 may generally include a bearing pad 106 (e.g., configured in the same manner described above) and a damper assembly 105. Accordingly, as may be seen most clearly in, e.g., FIG. 1, the bearing 100 includes a plurality of bearing pads 106 substantially evenly spaced along the circumferential direction C1. Each of the bearing pads 106 defines a respective inner surface 108, the inner surfaces 108 of the plurality of bearing pads 106 together defining a substantially annular support surface along the circumferential direction C1 and a linear support surface along the axial direction A1 (see, e.g., FIG. 2) for supporting a rotary component 145.

The bearing pads 106 may be fabricated from any material suitable to withstand the working conditions of the bearing 100. In addition, in some embodiments, the bearing pads 106 may be fabricated from a material having a sufficiently low porosity to prevent instabilities in the thin gas film created between bearing pads 106 and the rotary component 145 during operation of, e.g., the turbomachine, and also provide a more uniformly distributed gas delivery to the gas film region. For example, in some embodiments, the bearing pads 106 may be fabricated from porous carbons, such as carbon graphite, sintered porous ceramics, and sintered porous metals, such as cobalt, nickel, or iron-based alloys.

Moreover, in some embodiments, the bearing pad 106 and damper assembly 105 of each section 122 may be formed integrally of a single, continuous material. For example, in some embodiments, each of the bearing pads 106 may be formed integrally with the damper assembly 105 of the respective section 122 of the bearing 100, such that the bearing pad 106 and damper assembly 105 of the respective section 122 are fabricated to form a single integral part. Moreover, in certain embodiments, a plurality of bearing pads 106 and damper assemblies 105 forming two or more sections 122 may be formed integrally, or further still, each of the plurality of bearing pads 106 and respective damper assemblies 105 forming the bearing 100 may be formed integrally.

The bearing pads 106 and damper assembly 105 may be fabricated via any technique suitable to facilitate forming the integral part depicted and described below. For example, in some embodiments, the bearing pads 106 and the damper assembly 105 may be fabricated using an additive manufacturing process (also known as rapid prototyping, rapid manufacturing, and 3D printing), such as selective laser sintering (SLS), direct metal laser sintering (DMLS), electron beam melting (EBM), diffusion bonding, or selective heat sintering (SHS). It should be appreciated, however, that in other embodiments one or more of the bearing sections 122, including a bearing pad 106 and a respective damper assembly 105, may be formed integrally of a single, continuous material and joined to separately formed, adjacent bearing sections 122 in any other suitable manner, such as through a mechanical fastening means.

Referring particularly to FIG. 2, as noted above each of the bearing sections 122 includes a damper assembly 105. More particularly, for the embodiment depicted, the damper assembly 105 at least partially defines a first fluid damper cavity 124 and a second fluid damper cavity 126. The first fluid damper cavity 124 is positioned adjacent to the bearing pad 106 and the second fluid damper cavity 126 is spaced from the first fluid damper cavity 124, or more particularly, is spaced from the first fluid damper cavity 124 along the radial direction R1.

For the embodiment depicted, the damper assembly 105 for each bearing section 122 generally includes a first, outer wall 128 and a second, inner wall 130. The inner wall 130 and outer wall 128, for the embodiment depicted, are configured as a serpentine inner wall 130 and a serpentine outer wall 128 (i.e., a wall extending in a variety of directions), respectively. For example, the bearing pad 106 generally defines an outer periphery 132. The serpentine outer wall 128 is attached to or formed integrally with the bearing pad 106 proximate the outer periphery 132 of the bearing pad 106 (or rather, at the outer periphery 132 of the bearing pad 106), extends generally towards the center 118 of the bearing pad 106 along the axial direction A1, and subsequently extends back away from the center 118 of the bearing pad 106 along the axial direction A1, connecting with a body 134 of the housing 110. Similarly, for the embodiment depicted, the inner wall 130 is attached to or formed integrally with the bearing pad 106 proximate the center 118 of the bearing pad 106 (or rather, at the center 118 of the bearing pad 106), extends generally away from the bearing pad 106 along the radial direction R1, and subsequently extends away from the center 118 of the bearing pad 106 along the axial direction A1, also connecting with the body 134 of the housing 110.

Further, as is depicted schematically, the outer wall 128 generally includes a semi-rigid portion 136 and a rigid portion 138, and similarly the inner wall 130 includes a semi-rigid portion 140. As is depicted, the outer wall 128 at least partially defines the first fluid damper cavity 124 and at least partially defines the second fluid damper cavity 126. Additionally, the bearing pad 106 at least partially defines the first fluid damper cavity 124, and the inner wall 130 at least partially defines the second fluid damper cavity 126. More particularly, for the embodiment depicted the semi-rigid portion 136 of the outer wall 128 and bearing pad 106 together define the first fluid damper cavity 124, and the rigid portion 138 of the outer wall 128 and semi-rigid portion 140 of the inner wall 130 together define the second fluid damper cavity 126.

It should be appreciated, that as used herein, the terms "semi-rigid" and "rigid" are relative terms. Accordingly, a component of the bearing 100 described as semi-rigid may be configured to bend, flex, or give way prior to a component of the bearing 100 described as rigid. Further, a component of the bearing 100 described as "semi-rigid" herein refers to a component configured to bend, flex, or give way during normal operation of the bearing 100 while incurring little or no damage.

Moreover, for the embodiment depicted the first fluid damper cavity 124 is in flow communication with the second fluid damper cavity 126 through a portion of the column 116. Specifically, the exemplary column 116 depicted is configured as a double-walled column 116 formed from a portion of the inner wall 130 and a portion of the outer wall 128. Accordingly, the column 116 is supported at a radially outer end by the rigid portion 138 of the outer wall 128 and the semi-rigid portion 140 of the inner wall 130. Further, at a radially inner end the portion of the column 116 formed by the inner wall 130 is attached to the bearing pad 106 (or rather formed integrally with the bearing pad 106), and the portion of the column 116 formed by the outer wall 128 is attached to the bearing pad 106 through the semi-rigid portion 136 of the outer wall 128.

Moreover, the inner wall 130 defines an inner channel 142 for providing the bearing pad 106 with the working gas, and the outer wall 128 and inner wall 130 together define an outer channel 144. As will be appreciated, for the embodiment depicted the outer channel 144 is concentric with the inner channel 142 and defines a substantially annular shape around the inner channel 142. Further, for the embodiment depicted, the outer channel 144 is configured as a clearance gap, such that the first fluid damper cavity 124 and the second fluid damper cavity 126 are in restrictive flow communication through the outer channel 144.

Further, the first fluid damper cavity 124, second fluid damper cavity 126, and outer channel 144 are all sealed together, and together define a fixed volume. During operation, the first and second fluid damper cavities 124, 126 and outer channel 144 are each completely filled with the dampening fluid. The dampening fluid may be, e.g., an oil, such as heat transfer oil, or alternatively may be any other suitable fluid, such as any suitable incompressible liquid. The bearing 100 is configured to transfer the damper fluid from the first fluid damper cavity 124, through the outer channel 144/clearance gap, and to the second fluid damper cavity 126 in response to a force acting on the bearing pad 106.

When a force acts on the bearing pad 106, such as when the rotary component 145 supported by the bearing 100 presses on the bearing pad 106 generally along the radial direction R1, the portion of the housing 110 forming the damper assembly 105 allows for the bearing pad 106 to move along the radial direction R1, absorbing such force. More particularly, as the column 116 supporting the bearing pad 106 moves up (or radially outward), the semi-rigid portion 136 of the outer wall 128 partially deforms (decreasing a volume of the first fluid damper cavity 124), a portion of the damping fluid within the first fluid damper cavity 124 is forced through the outer channel 144 of the column 116, configured as a clearance gap, and flows into the second fluid damper cavity 126. At the same time, the rigid portion 138 of the outer wall 128 remains substantially stationary, and the semi-rigid portion 140 of the inner wall 130 partially deforms to increase a volume of the second fluid damper cavity 126 and accept the portion of the dampening fluid provided through the outer channel 144 of the column 116 from the first fluid damper cavity 124. Such movement absorbs the force exerted on the bearing pad 106, and dampens such movement. For example, the relatively tight clearance of the outer channel 144/clearance gap resists relatively quick movement of the bearing pad 106 along the radial direction R1. In the absence of the force exerted on the bearing pad 106, the dampening fluid transferred to the second fluid damper cavity 126 may reverse in flow direction, and flow back through the outer channel 144 of the column 116 to the first fluid damper cavity 124.

It should be appreciated, however, that in other exemplary embodiments, the gas bearing depicted in FIGS. 1 and 2 may be configured in any other suitable manner. For example, although the exemplary gas bearing depicted in FIGS. 1 and 2 is configured as a radial support bearing, in other embodiments, the gas bearing may instead be configured as an axial support bearing, or thrust bearing.

Figure 3:
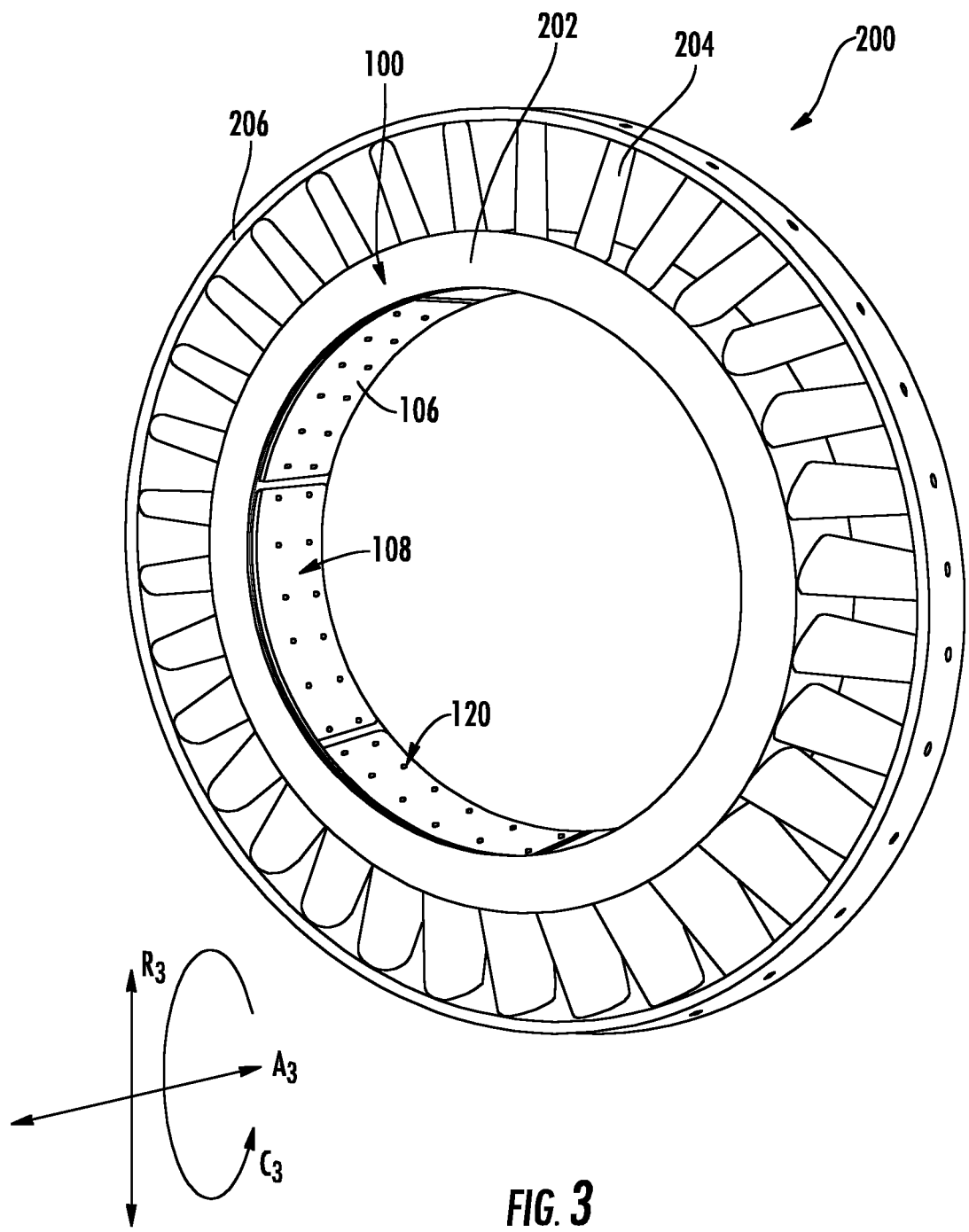
FIG. 3 is a perspective view of a nozzle section in accordance with an exemplary embodiment of the present disclosure.

Further, a gas bearing in accordance with an exemplary embodiment of the present disclosure may be incorporated into a gas turbine engine, or may be combined with another component and incorporated into a gas turbine engine. For example, referring now to FIG. 3, a gas bearing in accordance with an exemplary embodiment of the present disclosure is depicted integrated into a nozzle stage 200, such as a turbine nozzle stage or a compressor nozzle stage. The exemplary nozzle stage 200 depicted includes a base 202, a plurality of nozzles 204, and an outer ring 206. The plurality of nozzles 204 extend from the base 202 to the outer ring 206, and are spaced along a circumferential direction (not shown). As is discussed in greater detail below, the plurality of nozzles 204 may be positioned in a core air flow path 324 of a gas turbine engine when installed in the gas turbine engine (see FIGS. 10 and 11).

The base 202 includes a gas bearing 100 integrated therein. The gas bearing 100 may be configured in the same manner as the exemplary gas bearing 100 described above with reference to FIGS. 1 and 2, and therefore the same numbers may refer to the same part or component. For example, the gas bearing integrated into the base 202 defines an inner surface 108. Notably, the gas bearing integrated into the base 202 of the nozzle stage 200 depicted may act as both a bearing 100 for the rotary component 214 as well as a seal for the rotary component 214.

Figure 4:
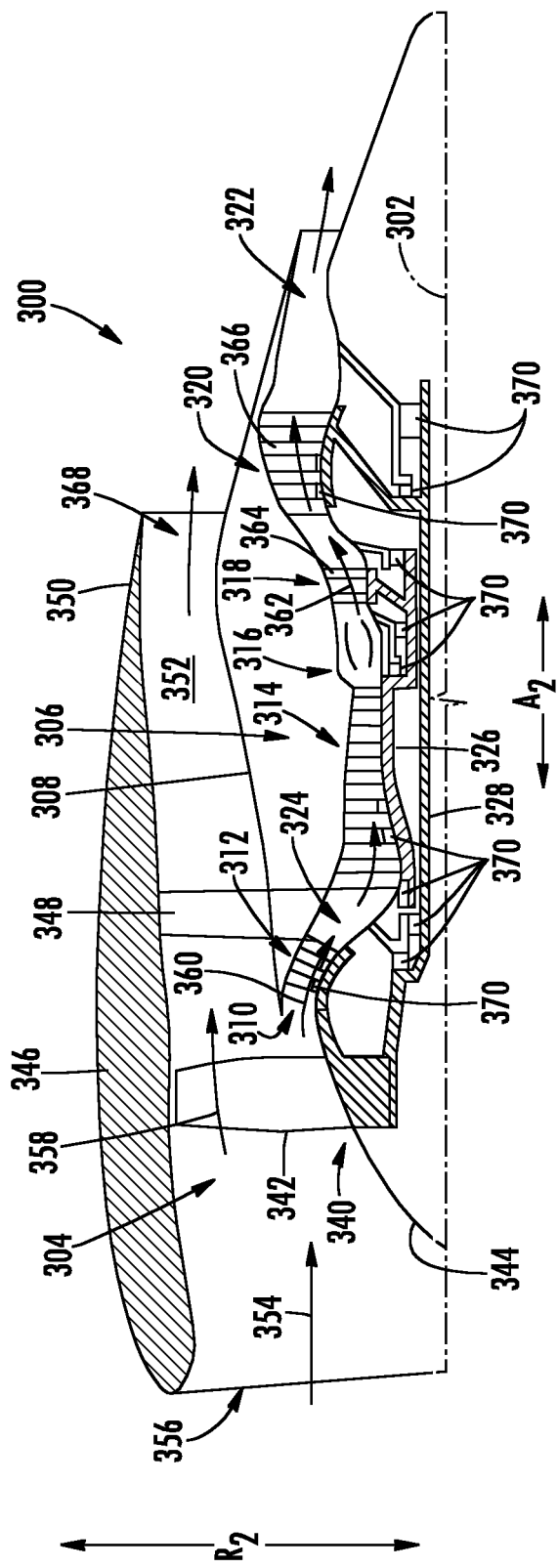
FIG. 4 is a schematic, cross-sectional view of a gas turbine engine in accordance with an exemplary embodiment of the present disclosure.

Referring now to FIG. 4, a schematic cross-sectional view is provided of a rotary machine for an aeronautical device in accordance with an exemplary embodiment of the present disclosure. For example, the rotary machine depicted may be a turbomachine for an aircraft. More particularly, for the embodiment of FIG. 4, the turbomachine is configured as a gas turbine engine, or rather as a high-bypass turbofan jet engine 300, referred to herein as "turbofan engine 300." As shown in FIG. 4, the turbofan engine 300 defines an axial direction A2 (extending parallel to a longitudinal centerline 302 provided for reference), a radial direction R2, and a circumferential direction C2 (i.e., a direction extending about the axial direction A2; not depicted) extending about the axial direction A2. In general, the turbofan 300 includes a fan section 304 and a core turbine engine 306 disposed downstream from the fan section 304.

The exemplary core turbine engine 306 depicted generally includes a substantially tubular outer casing 308 that defines an annular inlet 310. The outer casing 308 encases the core turbine engine 306, and the core turbine engine 306 includes a thrust generator. More particularly, the thrust generator includes, in serial flow relationship, a compressor section including a booster or low pressure (LP) compressor 312 and a high pressure (HP) compressor 314; a combustion section 316; a turbine section including a high pressure (HP) turbine 318 and a low pressure (LP) turbine 320; and a jet exhaust nozzle section 322. The compressor section, combustion section 316, turbine section, and jet exhaust nozzle section 322 together define a core air flow path 324. However, the core turbine engine 306, and more specifically, the thrust generator, may in other embodiments have any other suitable configuration for generating thrust and/or rotational energy. A high pressure (HP) shaft or spool 326 drivingly connects the HP turbine 318 to the HP compressor 314. A low pressure (LP) shaft or spool 328 drivingly connects the LP turbine 320 to the LP compressor 312. Accordingly, the LP shaft 328 and HP shaft 326 are each rotary components, rotating about the axial direction A2 during operation of the turbofan engine 300.

Referring still to the embodiment of FIG. 4, the fan section 304 also includes a thrust generator, or more particularly, a fan 340 having a plurality of fan blades 342 extending outwardly generally along the radial direction R. As will be appreciated, the plurality of fan blades 342 are spaced along the circumferential direction C2. The fan blades 342 are together rotatable about the longitudinal axis 302 by the LP shaft 328. Additionally, the fan 340 includes a rotatable front hub 344 aerodynamically contoured to promote an airflow through the plurality of fan blades 342, and an annular fan casing or outer nacelle 346 that circumferentially surrounds the fan 340 and/or at least a portion of the core turbine engine 306. The exemplary nacelle 346 is supported relative to the core turbine engine 306 by a plurality of circumferentially-spaced outlet guide vanes 348. Moreover, a downstream section 350 of the nacelle 346 extends over an outer portion of the core turbine engine 306 so as to define a bypass airflow passage 352 therebetween.

During operation of the turbofan engine 300, a volume of air 354 enters the turbofan 300 through an associated inlet 356 of the nacelle 344 and/or fan section 304. As the volume of air 354 passes across the fan blades 342, a first portion of the air 354 as indicated by arrows 358 is directed or routed into the bypass airflow passage 352 and a second portion of the air 354 as indicated by arrow 360 is directed or routed into the core air flow path 324, or more specifically into the LP compressor 312. The ratio between the first portion of air 358 and the second portion of air 360 is commonly known as a bypass ratio. The pressure of the second portion of air 360 is then further increased as it is routed through the high pressure (HP) compressor 314 and into the combustion section 316, where it is mixed with fuel and burned to provide combustion gases 362.

The combustion gases 362 are routed through the HP turbine 318 where a portion of thermal and/or kinetic energy from the combustion gases 362 is extracted via sequential stages of HP turbine rotor blades 364 that are coupled to the HP shaft or spool 326, thus causing the HP shaft or spool 326 to rotate, thereby supporting operation of the HP compressor 314. The combustion gases 362 are then routed through the LP turbine 320 where a second portion of thermal and kinetic energy is extracted from the combustion gases 362 via LP turbine rotor blades 366 that are coupled to the LP shaft or spool 328, thus causing the LP shaft or spool 328 to rotate, thereby supporting operation of the LP compressor 312 and/or rotation of the fan 340.

The combustion gases 362 are subsequently routed through the jet exhaust nozzle section 322 of the core turbine engine 306 to provide propulsive thrust. Simultaneously, the pressure of the first portion of air 358 is substantially increased as the first portion of air 358 is routed through the bypass airflow passage 352 before it is exhausted from a fan nozzle exhaust section 368 of the turbofan 300, also providing propulsive thrust.

The various rotary components of the exemplary turbofan engine 300 depicted in FIG. 4 are supported by a plurality of gas bearings 370. Notably, in certain exemplary embodiments one or more of the exemplary gas bearings 370 may be configured in substantially the same manner as the exemplary gas bearings 100 described above with reference to FIGS. 1 and 2. Specifically, as discussed, the turbofan engine 300 includes the LP shaft 328 attached to and rotatable with the LP compressor 312 of the compressor section and the LP turbine 320 of the turbine section. The plurality of gas bearings 370 substantially completely support the LP shaft 328, along with the LP compressor 312 and the LP turbine 320. Further, the turbofan engine 300 includes the HP shaft 326 attached to and rotatable with the HP compressor 314 of the compressor section and the HP turbine 318 of the turbine section. The plurality of gas bearings 370 also substantially completely support the HP shaft 326, along with the HP compressor 314 and the HP turbine 318. Notably, although the exemplary turbofan engine 300 includes the plurality of gas bearings 370 directly supporting the LP compressor 312, the LP turbine 320, the HP compressor 314, and the HP turbine 318, in other exemplary embodiments, the plurality of gas bearings 370 may instead substantially completely support these components by directly supporting the LP shaft 328 and HP shaft 326.

Figure 5:
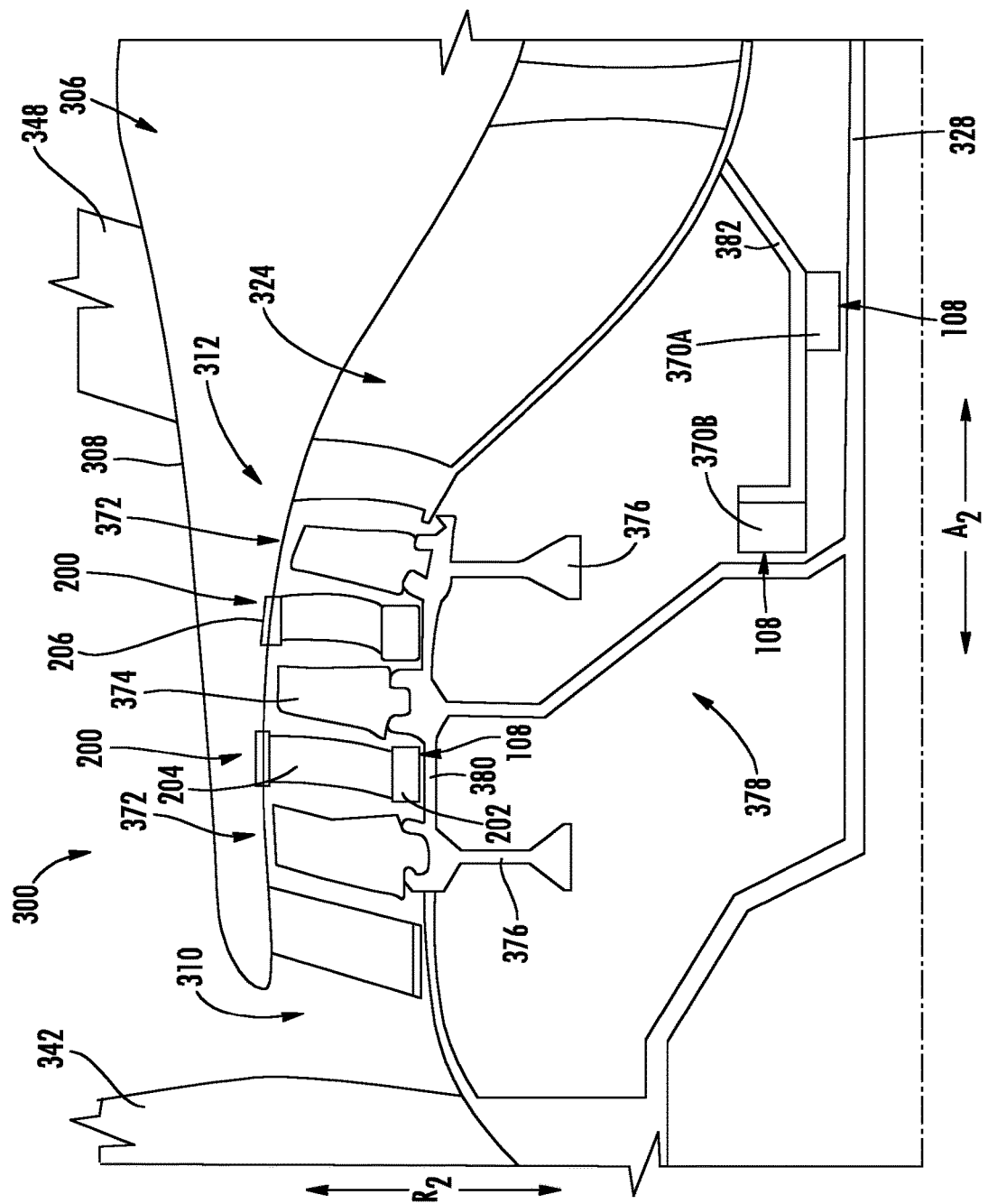
FIG. 5 is a schematic, cross-sectional, close up view of a compressor section of the exemplary gas turbine engine of FIG. 4.
Figure 6:
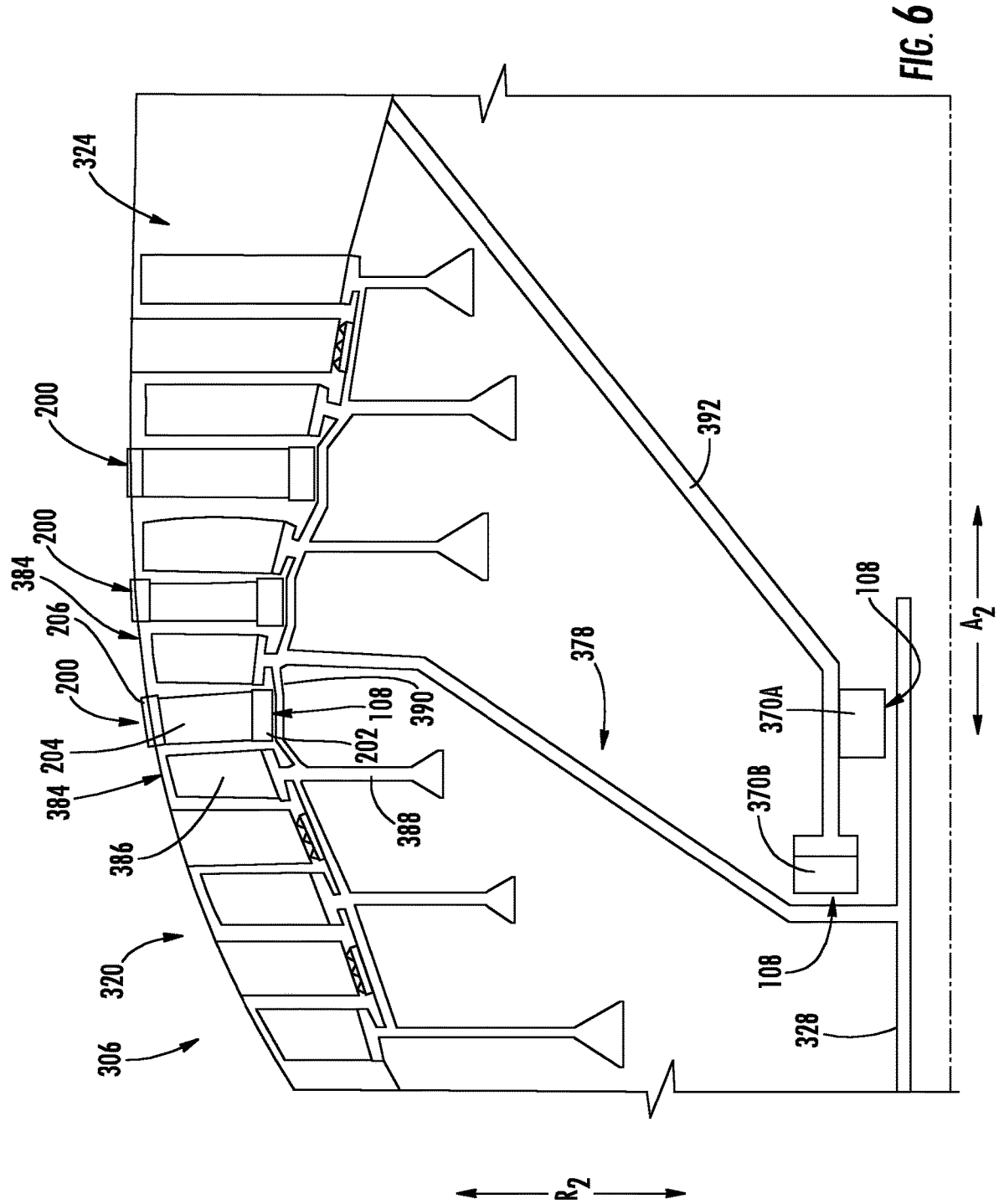
FIG. 6 is a schematic, cross-sectional, close up view of a turbine section of the exemplary gas turbine engine of FIG. 4.

Specifically, referring now also to FIGS. 5 and 6, close-up views of the exemplary turbofan engine 300 of FIG. 4 are provided. FIG. 5 provides a close-up view of the compressor section of the exemplary turbofan engine 300, and FIG. 6 provides a close-up view of the turbine section of the exemplary turbofan engine 300.

Referring particularly to FIG. 5, a close-up view of the low pressure (LP) compressor 312 is provided, the LP compressor 312 including three compressor stages 372. Each compressor stage 372 includes a plurality of compressor rotor blades 374 spaced along the circumferential direction C2 within the core air flow path 324. Additionally, each of the compressor rotor blades 374 is attached to a respective compressor rotor 376 at an inner end along a radial direction R2.

The turbofan engine 300 additionally includes within the compressor section a rotary component 378 attached to and rotatable with a portion of the compressor section. The rotary component 378 attaches the various stages of compressor rotors 212 and drives/rotates the LP compressor 312 during operation. More specifically, the rotary component 378 includes a shaft, which for the embodiment depicted is configured as the LP shaft 328, and a plurality of compressor connectors 380 extending between and connecting the various stages 372 of compressor rotor blades 374 (i.e., a first, second, and third stage 372 of compressor rotor blades 374).

The plurality of gas bearings 370 referred to above substantially completely support the LP compressor 312 and the compressor portion of the LP shaft 328. Specifically, the plurality of gas bearings 370 includes a radial support bearing 370A attached to a static member 382 of the turbofan engine 300 and directly supporting and axially extending portion of the LP shaft 328. Additionally, the plurality of gas bearings 370 includes an axial thrust support bearing 370B also attached to the static member 382 of the turbofan engine 300 and directly supporting a radially extending portion of the LP shaft 328. The radial support bearing 370A and axial thrust bearing 370B are each located inward of the core air flow path 324 and separated from the core air flow path 324.

In addition, the plurality of gas bearings 370 includes one or more gas bearings 370 integrated into a base 202 of a nozzle stage 200. Specifically, the exemplary compressor section depicted includes two nozzle stages 200, each nozzle stage 200 located between two sequential compressor stages 372 of the LP compressor 312. Further, each of the two nozzle stages 200 supports the rotary component 378, or rather directly support the compressor connectors 380 of the rotary component 378, connecting the two compressor stages 372 of the LP compressor 312 between which each respective nozzle stage 200 is located.

Each nozzle stage 200 depicted in FIG. 5 may be configured in a manner similar to the exemplary nozzle stage 200 described above with reference to FIG. 3. For example, each nozzle stage 200 depicted generally includes a base 202, a plurality of nozzles 204, and an outer ring 206. Additionally, the plurality of nozzles 204 are spaced along the circumferential direction C2 and extend from the base 202 to the outer ring 206, through the core air flow path 324. With such a configuration, the plurality of nozzles 204 may also be referred to as compressor stator vanes.

Further, as stated, the base 202 includes a gas bearing 370. The gas bearing 370 may be configured in a manner similar to the exemplary gas bearing 100 described above. For example, as discussed above, the bearing 370 included within the base 202 may have a plurality of bearing pads 106 defining an inner surface 108 for supporting the rotary component 378 (see FIGS. 1 and 2). During operation, the gas bearing 370 may provide a flow of working gas through the inner surface 108 to provide a low friction support for the rotary component 378. More particularly, the nozzle stage 200 may be configured such that the inner surface 108 is located in a tight clearance relationship with the rotary component 378, such that the airflow provided through the inner surface 108 creates a thin fluid film between the inner surface 108 and the rotary component 378.

Furthermore, the gas bearings 370 integrated into the bases 202 of the respective exemplary nozzle stages 200 in the compressor section may be in airflow communication with, and configured to receive a flow of working gas from, the compressor section at a location downstream from the two stages 372 of compressor rotor blades 374 between which the respective nozzle stage 200 is located. Accordingly, with such a configuration, the respective gas bearing 370 may utilize a working gas at a higher pressure than the respective two stages 372 of compressor rotor blades 374 to generate or create a thin fluid film for lubricating the rotary component 378. With such an embodiment, the gas bearings 370 integrated into the bases 202 of the respective nozzle stages 200 may further act as a seal between the respective two stages 372 of compressor rotor blades 374, and between an inner surface of the gas bearing 370 and the rotary component 378.

Referring now particularly to FIG. 6, a close-up, schematic, side view of the turbine section of the turbofan engine 300 is provided. Similar to the exemplary compressor section described above with reference to FIG. 5, the exemplary turbine section depicted generally includes a turbine having one or more turbine stages 384. The turbine section at least partially defines the core air flow path 324, and includes the low pressure (LP) turbine 320. The exemplary LP turbine 320 includes at least seven turbine stages 384. However, in other embodiments, the LP turbine 320 may have any other suitable number of turbine stages 384. Each turbine stage 384 includes a plurality of turbine rotor blades 386 spaced along the circumferential direction C2 in the core air flow path 324. Additionally, each of the turbine rotor blades 386 are attached to a respective turbine rotor 388. The turbofan engine 300 further includes within the turbine section a rotary component 378 attached to and rotatable with a portion of the turbine section. More particularly, the rotary component 378 includes a plurality of turbine connectors 390 and the LP shaft 328. The turbine connectors 390 attach the various stages of turbine rotors 384 and the LP shaft 328 imparts rotational energy extracted from an airflow through the LP turbine 320 to a turbine portion of the LP shaft 328. The LP shaft 328 connects the LP turbine 320 to the LP compressor 312 described above with reference to FIG. 5.

As discussed above, the plurality of gas bearings 370 substantially completely support the LP turbine 320 and the turbine portion of the LP shaft 328. Specifically, the plurality of gas bearings 370 includes a radial support bearing 370A attached to a static member 392 of the turbofan engine 300 and directly supporting an axially extending portion of the LP shaft 328 within the turbine section. Additionally, the plurality of gas bearings 370 includes an axial thrust support bearing 370B also attached to the static member 392 of the turbofan engine 300 and directly supporting a radially extending portion of the LP shaft 328 within the turbine section. The radial support bearing 370A and axial thrust bearing 370B are each located inward of the core air flow path 324 and separated from the core air flow path 324.

Further, as with the exemplary compressor section described above with reference to FIG. 5, for the exemplary LP turbine 320 depicted, the rotary component 378, including the LP shaft 328 and the turbine connectors 390, is supported by one or more gas bearings 370 incorporated into a base 202 of a nozzle stage 200 in accordance with an exemplary embodiment of the present disclosure. Specifically, the exemplary turbine section depicted includes three gas bearings 370 integrated into a respective nozzle stage 200. The exemplary nozzle stages 200 depicted are each located between two sequential turbine stages 384 of the LP turbine 320.

Referring still to FIG. 6, each nozzle stage 200 depicted having an exemplary gas bearing 370 integrated therein may also be configured in a manner similar to the exemplary nozzle stage 200 described above with reference to FIG. 4. For example, each nozzle stage 200 depicted generally includes a base 202, a plurality of nozzles 204, and an outer ring 206. Additionally, the plurality of nozzles 204 are spaced along the circumferential direction C2 and extend from the base 202 to the outer ring 206, through the core air flow path 324. With such a configuration, the plurality of nozzles 204 may also be referred to as turbine stator vanes.

Further, as stated, the base 202 includes a gas bearing 370 incorporated therein. The gas bearing 370 may be configured in a manner similar to the exemplary gas bearing 100 described above. For example, as discussed above the bearing 370 included within the base 202 may have a plurality of bearing pads 106 defining an inner surface 108 for supporting the rotary component 378. During operation, the gas bearing 370 may provide a flow of working gas through the inner surface 108 to provide a low friction support for the rotary component 378. More particularly, the nozzle stage 200 may be configured such that the inner surface 108 is located in a tight clearance relationship with the rotary component 378, such that the airflow provided through the inner surface 108 creates a thin fluid film between the inner surface 108 and the rotary component 378.

A gas turbine engine in accordance with one or more the exemplary aspects of the present disclosure may allow for a simpler, lighter, and less expensive gas turbine engine. More particularly, by including a plurality of gas bearings for substantially completely supporting one or more of the various rotary components, turbines, and/or compressors, the gas turbine engine may do away with the oil-lubricated bearings, and all associated supporting structure (e.g., sumps, oil pumps, oil lines, etc.).

It should be appreciated, however, that in other embodiments, the gas turbine engine may be configured in any other suitable manner. For example, in other embodiments, one or more oil-lubricated bearings may be used in addition to the gas bearings 370 described herein. Additionally, or alternatively, the compressor section and/or turbine section may include any suitable number of nozzle stages 200, and is not limited to the number of nozzle stages 200 incorporated in the exemplary compressor and turbine sections described herein. Further, it should also be appreciated that in still other exemplary embodiments, aspects of the present disclosure may be incorporated into any other suitable gas turbine engine or turbomachine. For example, in other exemplary embodiments, aspects of the present disclosure may be incorporated into, e.g., a turboprop engine, a turboshaft engine, or a turbojet engine.

Figure 7:
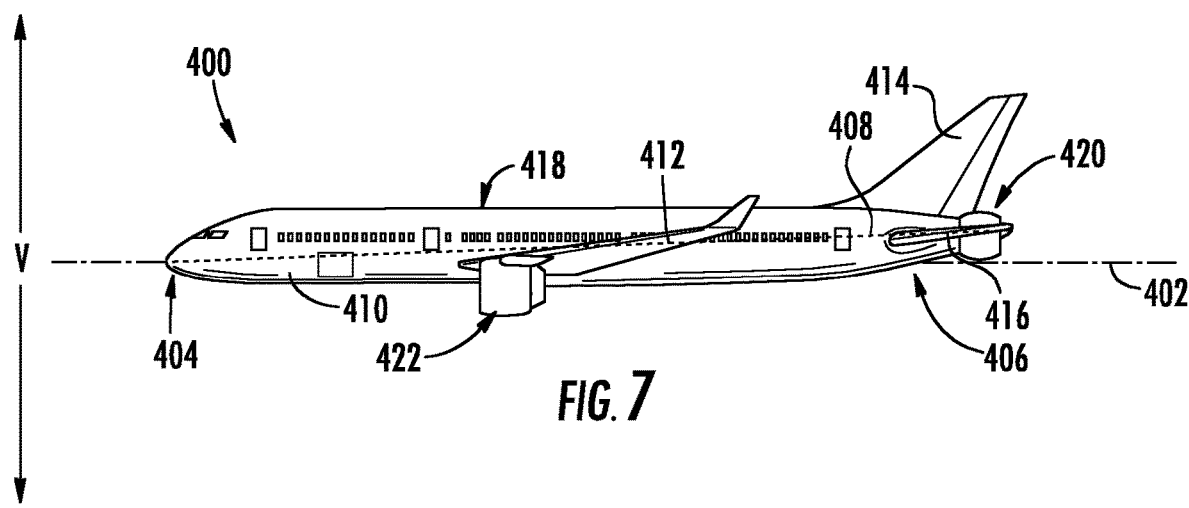
FIG. 7 is a side view of an aircraft in accordance with an exemplary embodiment of the present disclosure.

Referring now to FIG. 7, a port side view of an aeronautical device in accordance with an exemplary embodiment of the present disclosure is provided. The exemplary aeronautical device depicted is an aircraft 400. As shown in FIG. 7, the aircraft 400 defines a longitudinal centerline 402 that extends therethrough, a vertical direction V, a forward end 404, and an aft end 406. Moreover, the aircraft 400 defines a mean line 408 extending between the forward end 404 and aft end 406 of the aircraft 400. As used herein, the "mean line" refers to a midpoint line extending along a length of the aircraft 400, not taking into account the appendages of the aircraft 400 (such as the wings 412 and stabilizers, discussed below).

Moreover, the aircraft 400 includes a fuselage 410, extending longitudinally from the forward end 404 of the aircraft 400 towards the aft end 406 of the aircraft 400, and a pair of wings 412. As used herein, the term "fuselage" generally includes all of the body of the aircraft 400, such as an empennage of the aircraft 400. The aircraft 400 further includes a vertical stabilizer 414 and a pair of horizontal stabilizers 416. The fuselage 410 additionally includes an outer surface or skin 418. It should be appreciated however, that in other exemplary embodiments of the present disclosure, the aircraft 400 may additionally or alternatively include any other suitable configuration of, e.g., stabilizer that may or may not extend directly along the vertical direction V or horizontal direction.

The exemplary aircraft 400 of FIG. 7 includes a plurality of rotary machines. Specifically, the exemplary aircraft 400 includes a pair of aircraft engines, at least one of which mounted to each of the pair of wings 412, and an electric fan engine 420. For the embodiment depicted, the aircraft engines are configured as turbofan jet engines 422 suspended beneath the wings 412 in an under-wing configuration. Additionally, the electric fan engine 420 is configured to ingest and consume air forming a boundary layer over the fuselage 410 of the aircraft 400. Accordingly, the aft engine is configured as a "boundary layer ingestion fan." Additionally, the electric fan engine 420 is mounted to the aircraft 400 at a location aft of the wings 412 and/or the jet engines 422, along the mean line 408, such that the mean line 408 extends therethrough. Specifically, for the embodiment depicted, the electric fan engine 420 is fixedly connected to the fuselage 410 at the aft end 406, such that the electric fan engine 420 is incorporated into or blended with a tail section at the aft end 406. Accordingly, the electric fan engine 420 is configured as an "aft fan." However, it should be appreciated that in various other embodiments, the electric fan engine 420 may alternatively be positioned at any suitable location of the aft end 406, or elsewhere on the aircraft 400.

Notably, in various embodiments, the jet engines 422 may be configured in a manner similar to the exemplary turbofan engine 300 discussed above with reference to FIGS. 4 through 6. Additionally, in certain embodiments, the jet engines 422 may provide mechanical power to one or more electric generators (not shown). The one or more electric generators may convert the mechanical power provided by the jet engines 422 to electrical power, and such electrical power may in turn be provided to the electric fan engine 420.

Figure 8:
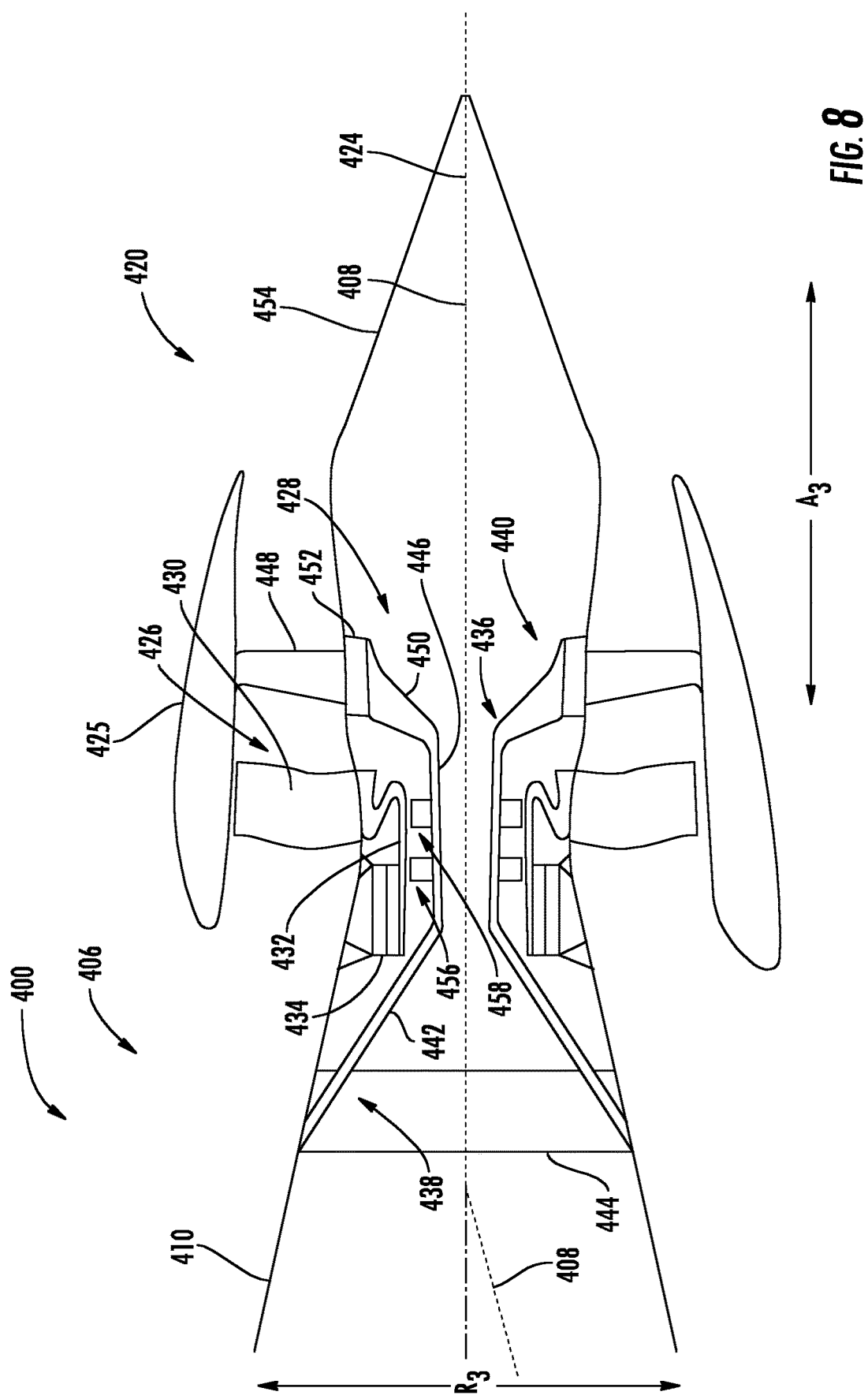
FIG. 8 is a side, schematic, cross-sectional view of an electric fan engine in accordance with an exemplary embodiment of the present disclosure, as may be incorporated in the exemplary aircraft of FIG. 7.

Referring now to FIG. 8, a schematic, cross-sectional side view of the electric fan engine 420 of FIG. 7 is provided. As shown, the electric fan engine 420 defines an axial direction A2 extending along a longitudinal centerline axis 424 that extends therethrough for reference, as well as a radial direction R3 and a circumferential direction C3 (i.e., a direction extending about the axial direction A3, not shown).

In general, the electric fan engine 420 includes a fan 426 rotatable about the centerline axis 424, a nacelle 425 extending around a portion of the fan 426, and a structural support system 428. The fan 426 includes a plurality of fan blades 430 and a fan shaft 432. The plurality of fan blades 430 are attached to the fan shaft 432 and spaced generally along the circumferential direction C3.

In certain exemplary embodiments, the plurality of fan blades 430 may be attached in a fixed manner to the fan shaft 432, or alternatively, the plurality of fan blades 430 may be rotatably attached to the fan shaft 432. For example, the plurality of fan blades 430 may be attached to the fan shaft 432 such that a pitch of each of the plurality of fan blades 430 may be changed, e.g., in unison, by a pitch change mechanism (not shown). Changing the pitch of the plurality of fan blades 430 may increase an efficiency of the electric fan engine 420 and/or may allow the electric fan engine 420 to achieve a desired thrust profile. With such an exemplary embodiment, the electric fan engine 420 may be referred to as a variable pitch fan.

The fan shaft 432 is mechanically coupled to a power source located at least partially within the fuselage 410 of the aircraft 400, which for the embodiment depicted is configured as an electric motor 434. The electric motor 434 may receive power from one or both of an energy storage device or an electric generator—the electric generator converting mechanical power from, e.g., the jet engines 422 to electrical power. Notably, the electric fan engine 420 may further include a gearbox (not shown) mechanically coupling the electric motor 434 to the fan shaft 432.

As briefly stated above, the electric fan engine 420 additionally includes a structural support system 428 for mounting the electric fan engine 420 to the aircraft 400. The structural support system 428 extends generally from the fuselage 410 of the aircraft 400, through the fan shaft 432, and to the nacelle 425 of the electric fan engine 420. More specifically, the structural support system 428 generally includes a support shaft 436 extending between a first end 438 and a second end 440. Notably, as used herein, the term "support shaft" refers generally to any structural member, such as a support beam or rod. At the first end 438, the support shaft 436 is attached to the fuselage 410 of the aircraft 400 through a plurality of forward attachment arms 442 of the support shaft 436. For example, the plurality of forward attachment arms 442 of the support shaft 436 at the first end 438 of the support shaft 436 may be attached to a bulkhead 444 of the fuselage 410 of the aircraft 400.

The support shaft 436 extends from the first end 438, in the aft direction, through at least a portion of the fan shaft 432. For the embodiment depicted, the support shaft 436 includes a cylindrical body portion 446 extending through a center of the fan shaft 432—the cylindrical body portion 446 of the support shaft 436 being concentric with the fan shaft 432.

The structural support system 428 further includes or more structural members 448 extending from the structural support shaft 436 to the nacelle 425. Specifically, for the embodiment depicted, the structural support shaft 436 includes a plurality of aft support arms 450 and a cylindrical support ring 452. The plurality of aft support arms 450 extend from the cylindrical body portion 446 of the support shaft 436 to the cylindrical support ring 452, and the one or more structural members 448 are attached to the cylindrical support ring 452. Additionally, for the embodiment depicted, the one or more structural members 448 include a plurality of circumferentially spaced structural members 448 attached to the second end 440 of the support shaft 436, i.e., to the cylindrical support ring 452. The one or more structural members 448 may provide structural support for the nacelle 425 and, e.g., a tail cone 454 of the electric fan engine 420.

For the embodiment depicted in FIG. 8, the plurality of structural members 448 extend substantially along the radial direction R3 to the nacelle 425, to provide structural support for the nacelle 425. Moreover, in at least certain exemplary embodiments, the structural members 448 may each be configured as an outlet guide vane. If configured as outlet guide vanes, the structural members 448 may be configured for directing a flow of air through the electric fan engine 420.

It should be appreciated, however, that the exemplary structural support system 428 depicted is provided by way of example only, and that in other exemplary embodiments, any other suitable structural support system 428 may be provided. For example, in other exemplary embodiments, the structural members 448 may instead define an angle relative to the radial direction R3, and further may be evenly or unevenly spaced along the circumferential direction C3. Additionally, the support shaft 436 may have any other suitable configuration. For example, in other exemplary embodiments, the support shaft 436 may be entirely formed of a cylindrical body portion, such that the cylindrical body portion mounts directly at a forward end to the fuselage 410 of the aircraft 400. Similarly, in other embodiments, the support shaft 436 may not include one or both of the aft attachment arms 450 or the cylindrical support ring 452. For example, in certain exemplary embodiments, the one or more structural members 448 may be attached directly to the cylindrical body portion 446 of the support shaft 436. Moreover, in still other embodiments, the support system 428 may include additional support features, e.g., static support features, positioned radially inward of the fan shaft 432 and, e.g., within the support shaft 436, or elsewhere for providing a desired amount of support for the structural member 448 and nacelle 425.

Referring still to the exemplary embodiment of FIG. 8, the cylindrical body portion 446 of the support shaft 436 supports rotation of the fan shaft 432. More particularly, for the embodiment depicted, a bearing assembly is provided between the body portion 446 of the support shaft 436 and the fan shaft 432. The exemplary bearing assembly depicted generally includes a plurality of gas bearings for substantially completely supporting the rotary component of the electric fan engine 420. More particularly, the exemplary bearing assembly depicted includes a forward gas bearing 456 and an aft gas bearing 458. The forward and aft gas bearings 456, 458 substantially completely support the fan shaft 432 of the electric fan engine 420. The forward and aft gas bearings 456, 458 may be configured in any suitable manner. For example, in certain exemplary embodiments, the forward and aft gas bearings 456, 458 may be configured in substantially the same manner as the exemplary gas bearing 100 described above with reference to FIGS. 1 and 2. It should also be appreciated, that although the exemplary gas bearings 456, 458 depicted in FIG. 8 are configured as radial support bearings, the electric fan engine 420 may additionally, or alternatively, include one or more axial support gas bearings (e.g. thrust bearings).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotary machine for an aeronautical device, the rotary machine comprising:
   a thrust generator;
   a rotary component rotatable with the thrust generator; and
   a plurality of gas bearings, the plurality of gas bearings substantially completely supporting the rotary component;
   wherein the rotary machine comprises a turbomachine, wherein the thrust generator comprises a compressor section and a turbine section of the turbomachine, and wherein the plurality of gas bearings substantially completely support the rotary component within the compressor section and within the turbine section;
   wherein the compressor section comprises a compressor having a first stage of compressor rotor blades and a second stage of compressor rotor blades, wherein the rotary component comprises a spool attached to and rotatable with the compressor, wherein the first and second stages of compressor rotor blades are attached through a connector, wherein the plurality of gas bearings comprises a gas bearing directly supporting the spool and a gas bearing having an inner surface that extends in a circumferential direction of the rotary machine directly supporting the connector.

2. The rotary machine of claim 1, wherein the turbine section comprises a turbine.

3. The rotary machine of claim 2, wherein the spool is further attached to and rotatable with the turbine, and wherein the plurality of gas bearings substantially completely support the spool.

4. The rotary machine of claim 3, wherein the turbine comprises two stages of turbine rotor blades attached through a connector, wherein the plurality of gas bearings comprises a gas bearing directly supporting the spool and a gas bearing directly supporting the connector.

5. The rotary machine of claim 2, wherein the turbine is a first turbine, wherein the turbine section further comprises a second turbine, wherein the compressor is a first compressor, wherein the compressor section further comprises a second compressor, wherein the rotary component is a first rotary component, wherein the turbomachine further comprises a second rotary component attached to and rotatable with the second compressor and the second turbine, and wherein the plurality of gas bearings substantially completely support the second rotary component, the second compressor, and the second turbine.

6. The rotary machine of claim 1, wherein the gas bearing directly supporting the connector is in airflow communication with, and is configured to receive a flow of working gas from, the compressor section at a location downstream of the second stage of compressor rotor blades.

7. The rotary machine of claim 1, wherein the plurality of gas bearings comprise a radial support bearing and a thrust bearing.

8. The rotary machine of claim 1, wherein each gas bearing in the plurality of gas bearings defines an inner surface and is configured to provide a flow of working gas through the inner surface to create a thin film over the inner surface.

9. The rotary machine of claim 8, wherein the working gas is compressed air from the compressor section of the turbomachine.

10. The rotary machine of claim 1, wherein the gas bearing directly supporting the connector is aligned with the connector along a radial direction.

11. The rotary machine of claim 10, wherein the gas bearing directly supporting the connector is positioned outward of the connector along the radial direction to directly support the connector.

12. The rotary machine of claim 1, wherein the inner surface of the gas bearing extends substantially continuously in the circumferential direction.

13. A turbomachine comprising:
   a compressor section comprising a compressor;
   a turbine section comprising a turbine;
   a spool comprising a compressor portion and a turbine portion, the compressor portion positioned within the compressor section and attached to and rotatable with the compressor, the turbine portion positioned within the turbine section and attached to and rotatable with the turbine; and
   a plurality of gas bearings substantially completely supporting the compressor and the compressor portion of the spool and the turbine and turbine portion of the spool;
   wherein the compressor comprises a first stage of compressor rotor blades and a second stage of compressor rotor blades, wherein the first and second stages of compressor rotor blades are attached through a connector, wherein the plurality of gas bearings comprises a gas bearing directly supporting the spool and a gas bearing directly supporting the connector, wherein the gas bearing directly supporting the connector includes an inner surface that extends in a circumferential direction of the turbomachine.

14. The turbomachine of claim 13, wherein the gas bearing directly supporting the connector is in airflow communication with, and is configured to receive a flow of working gas from, the compressor section at a location downstream of the second stage of compressor rotor blades.

15. The turbomachine of claim 13, wherein the plurality of gas bearings comprise a radial support bearing and a thrust bearing.

16. A rotary machine for an aeronautical device, the rotary machine comprising:
   a turbomachine having a rotary component and a plurality of gas bearings, the plurality of gas bearings substantially completely supporting the rotary component;
   wherein the turbomachine comprises a first stage of rotor blades, a second stage of rotor blades, and a connector extending between the first and second stages of rotor blades, wherein the rotary component comprises a spool attached to and rotatable with the first and second stages of rotor blades, wherein the plurality of gas bearings comprises a gas bearing having an inner surface that extends in a circumferential direction of the rotary machine supporting the connector and aligned with the connector along a radial direction of the turbomachine.

17. The rotary machine of claim 16, wherein the gas bearing supporting the connector is positioned outward of the connector along a radial direction to support the connector.

18. The rotary machine of claim 16, wherein the inner surface of the gas bearing extends substantially continuously in the circumferential direction.

* * * * *